(12) United States Patent
Mori et al.

(10) Patent No.: US 12,250,012 B2
(45) Date of Patent: Mar. 11, 2025

(54) RADIO-FREQUENCY CIRCUIT

(71) Applicant: Murata Manufacturing Co., Ltd., Nagaokakyo (JP)

(72) Inventors: Hirotsugu Mori, Nagaokakyo (JP); Satoshi Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 276 days.

(21) Appl. No.: 18/155,073

(22) Filed: Jan. 17, 2023

(65) Prior Publication Data

US 2023/0163791 A1 May 25, 2023

Related U.S. Application Data

(63) Continuation of application No. PCT/JP2021/022143, filed on Jun. 10, 2021.

(30) Foreign Application Priority Data

Jul. 21, 2020 (JP) ................................. 2020-124257

(51) Int. Cl.
*H04B 1/00* (2006.01)
*H04B 1/16* (2006.01)

(52) U.S. Cl.
CPC ......... *H04B 1/0057* (2013.01); *H04B 1/0078* (2013.01); *H04B 1/1615* (2013.01)

(58) Field of Classification Search
CPC .. H04B 1/0057; H04B 1/0078; H04B 1/1615; H04B 1/006; H04B 1/00; H04B 1/38; H04B 1/48

(Continued)

(56) References Cited

U.S. PATENT DOCUMENTS

2003/0153294 A1\* 8/2003 Hata .................... H04B 1/0003
455/67.11
2006/0194550 A1\* 8/2006 Block ...................... H04B 1/50
455/78

(Continued)

FOREIGN PATENT DOCUMENTS

CN 104518818 A 4/2015
EP 2693648 A1 2/2014

(Continued)

OTHER PUBLICATIONS

International Search Report and Written Opinion mailed on Aug. 24, 2021, received for PCT Application PCT/JP2021/022143, filed on Jun. 10, 2021, 11 pages including English Translation.

(Continued)

*Primary Examiner* — Tanmay K Shah
(74) *Attorney, Agent, or Firm* — XSENSUS LLP

(57) ABSTRACT

A radio-frequency circuit includes a switch and three filters. The switch is connected to an antenna connecting terminal. One filter has a pass band corresponding to a first sub-band and is configured to connect to the antenna connecting terminal via the switch. The first sub-band is included in a first band used for TDD communication. Another filter has a pass band corresponding to a second sub-band included in the first band and is configured to connect to the antenna connecting terminal via the switch. There is a gap between the first sub-band and the second sub-band. The remaining filter has a pass band corresponding to a third sub-band and is configured to connect to the antenna connecting terminal via the switch. The third sub-band includes the first sub-band, the second sub-band, and the gap.

20 Claims, 7 Drawing Sheets

(58) Field of Classification Search
USPC .................................................... 455/552.1
See application file for complete search history.

(56) References Cited

U.S. PATENT DOCUMENTS

| | | | |
|---|---|---|---|
| 2014/0111178 A1 | 4/2014 | Khlat et al. | |
| 2014/0167877 A1* | 6/2014 | Shimizu | H03H 7/463 333/101 |
| 2015/0304059 A1* | 10/2015 | Zuo | H04B 1/0057 370/343 |
| 2015/0372702 A1 | 12/2015 | Asuri et al. | |
| 2016/0006556 A1* | 1/2016 | Pehlke | H04B 1/0057 370/280 |
| 2016/0323080 A1* | 11/2016 | Khlat | H04B 1/38 |
| 2019/0097608 A1* | 3/2019 | Gathman | H03H 11/08 |
| 2020/0204157 A1 | 6/2020 | Park et al. | |
| 2020/0412403 A1* | 12/2020 | Pehlke | H04L 5/14 |

FOREIGN PATENT DOCUMENTS

| | | |
|---|---|---|
| JP | 2002-57596 A | 2/2002 |
| JP | 2015-513265 A | 4/2015 |
| JP | 2017-168932 A | 9/2017 |
| JP | 2018-37769 A | 3/2018 |
| JP | 2019-154025 A | 9/2019 |
| JP | 2020-501385 A | 1/2020 |
| WO | 2019/138743 A1 | 7/2019 |

OTHER PUBLICATIONS

Qualcomm Incorporated, "Intra-band Non-Contiguous ULCA Requirements", 3GPP TSG-RAN WG4 Meeting #94-e, R4-2000104, Feb. 14, 2020, pp. 1-5.
Huawei et al., "CR for intra-band CA configuration and DL RF requirements", 3GPP TSG-RAN4 WG4 Meeting # 94-e, R4-2002811, Feb. 14-Mar. 6, 2020, 13 pages.
Qualcomm et al., "WF on Intra-band Noncontiguous ULCA TX Architectures and Issues", 3GPP TSG-RAN WG4 Meeting #94-e, R4-2002812, Feb. 24-Mar. 6, 2020, 9 pages.
Office Action issued on Sep. 9, 2024, in corresponding Chinese patent Application No. 202180059977.9, 7 pages.

* cited by examiner

| No | FIRST SUB-BAND | SECOND SUB-BAND | THIRD SUB-BAND | FOURTH SUB-BAND |
|---|---|---|---|---|
| 1 | 3.70-3.80GHz | 4.00-4.10GHz | 3.30-4.20GHz | |
| 2 | 3.44-3.52GHz | 3.60-3.70GHz | 3.30-4.20GHz | |
| 3 | 3.44-3.52GHz | 3.55-3.70GHz | 3.30-4.20GHz | |
| 4 | 3.40-3.60GHz | 3.90-4.00GHz | 3.30-4.20GHz | |
| 5 | 3.30-3.80GHz | 3.90-4.00GHz | 3.30-4.20GHz | |
| 6 | 3.40-3.44GHz | 3.56-3.60GHz | 3.30-4.20GHz | 3.90-4.00GHz |
| 7 | 3.40-3.44GHz | 3.56-3.60GHz | 3.30-3.80GHz | |
| 8 | 5.15-5.35GHz | 5.47-5.925GHz | 5.15-5.925GHz | |
| 9 | 5.925-6.425GHz | 6.525-7.125GHz | 5.925-7.125GHz | |

FIG. 6

RADIO-FREQUENCY CIRCUIT

CROSS-REFERENCE TO RELATED APPLICATIONS

This is a continuation application of PCT International Application No. PCT/JP2021/022143 filed on Jun. 10, 2021, designating the United States of America, which is based on and claims priority of Japanese Patent Application No. 2020-124257 filed on Jul. 21, 2020. The entire disclosures of the above-identified applications, including the specifications, drawings, and claims are incorporated herein by reference in their entirety.

BACKGROUND

1. Technical Field

The present disclosure relates to a radio-frequency circuit.

2. Description of the Related Art

5th Generation New Radio (5GNR) allows for the use of a communication band having a wider bandwidth. The efficient use of such a wide communication band is now being studied. For example, some countries or some regions are considering dividing a wide communication band into multiple sub-bands and allocating them to different mobile network operators (MNOs). They are also considering performing communication by simultaneously using multiple non-contiguous component carriers (CCs) in a wide communication band. This is called intra-band non-contiguous carrier aggregation. An example of the related art is disclosed in U.S. Patent Application Publication No. 2014/0111178.

SUMMARY

In the related art, however, it is difficult to efficiently use such a wide communication band.

In terms of this background, it is an aspect of the present disclosure to provide a radio-frequency circuit that can efficiently use a wide communication band.

A radio-frequency circuit according to an embodiment of the present disclosure includes a first switch and first, second, and third filters. The first switch is connected to an antenna connecting terminal. The first filter has a pass band corresponding to a first sub-band and is configured to connect to the antenna connecting terminal via the first switch. The first sub-band is included in a first band used for time division duplex (TDD) communication. The second filter has a pass band corresponding to a second sub-band included in the first band and is configured to connect to the antenna connecting terminal via the first switch. There is a gap between the first sub-band and the second sub-band. The third filter has a pass band corresponding to a third sub-band and is configured to connect to the antenna connecting terminal via the first switch. The third sub-band includes the first sub-band, the second sub-band, and the gap.

According to an embodiment of the present disclosure, it is possible to efficiently use a wider communication band.

BRIEF DESCRIPTION OF THE DRAWINGS

FIG. 6 is a table illustrating some specific examples of multiple sub-bands.

DESCRIPTION OF THE EMBODIMENTS

Figure 1:
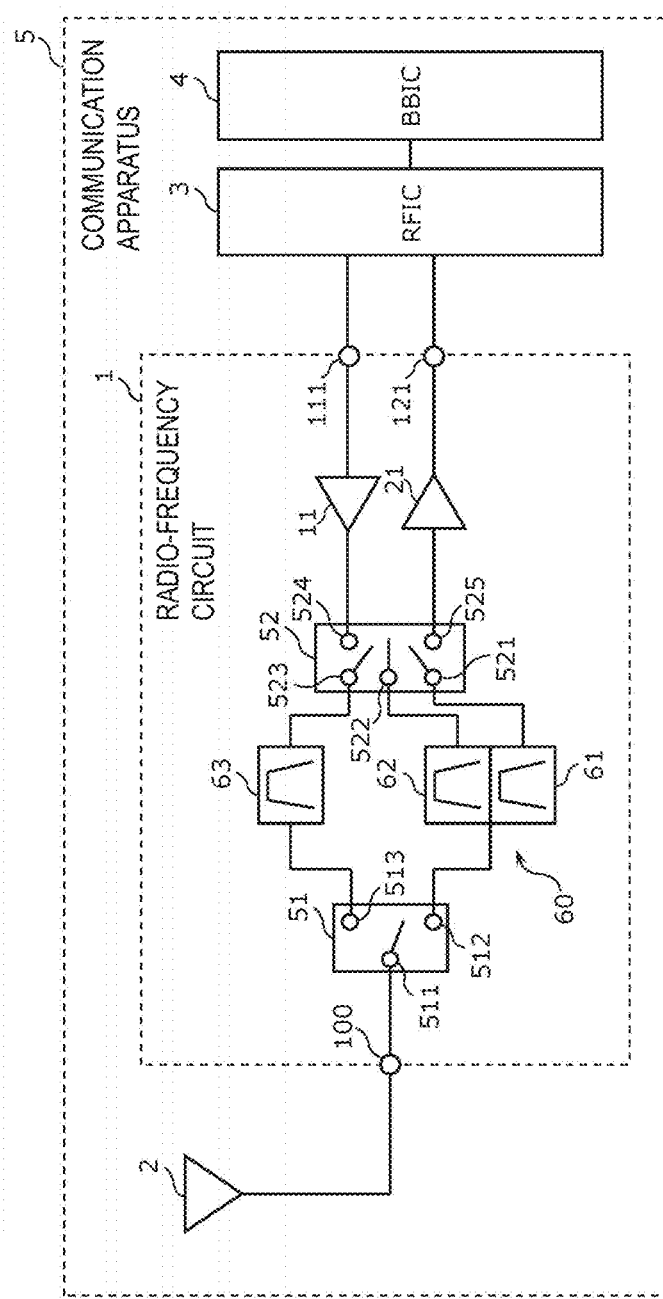
FIG. 1 is a circuit diagram of a radio-frequency circuit and a communication apparatus according to a first embodiment.

Embodiments of the disclosure will be described below in detail with reference to the accompanying drawings. All of the embodiments described below illustrate general or specific examples. Numerical values, configurations, materials, components, and positions and connection states of the components illustrated in the following embodiments are only examples and are not intended for limiting the disclosure.

The drawings are only schematically illustrated and are not necessarily precisely illustrated. For the sake of representation, the drawings may be illustrated in an exaggerated manner or with omissions, and the ratios of components in the drawings may be adjusted. The configurations, positional relationships, and ratios of components in the drawings may be different from those of the actual components. In the drawings, substantially identical components are designated by like reference numeral, and an explanation of such components will not be repeated or be merely simplified.

In this disclosure, "A connects to or is connected to B" includes, not only the meaning that A directly connects to or is directly connected to B using a connecting terminal and/or a wiring conductor, but also the meaning that A electrically connects to or is electrically connected to B via another circuit element. "Being connected between A and B" means that "connecting to or being connected to both A and B on a path which connects A and B".

First Embodiment

[1.1 Circuit Configurations of Radio-Frequency Circuit 1 and Communication Apparatus 5]

The circuit configurations of a radio-frequency circuit 1 and a communication apparatus 5 according to a first embodiment will be described below with reference to FIG. 1. FIG. 1 is a circuit diagram of the radio-frequency circuit 1 and the communication apparatus 5 according to the first embodiment.

[1.1.1 Circuit Configuration of Communication Apparatus 5]

The circuit configuration of the communication apparatus 5 will first be discussed. As illustrated in FIG. 1, the communication apparatus 5 according to the first embodiment includes a radio-frequency circuit 1, an antenna 2, a radio-frequency integrated circuit (RFIC) 3, and a baseband integrated circuit (BBIC) 4.

The radio-frequency circuit 1 conveys a radio-frequency signal between the antenna 2 and the RFIC 3. The detailed circuit configuration of the radio-frequency circuit 1 will be discussed later.

The antenna 2 is connected to an antenna connecting terminal 100 of the radio-frequency circuit 1. The antenna 2 sends a radio-frequency signal output from the radio-frequency circuit 1 and receives a radio-frequency signal from an external source and outputs it to the radio-frequency circuit 1.

The RFIC 3 is an example of a signal processing circuit that processes a radio-frequency signal. The RFIC 3 will be explained below more specifically. The RFIC 3 performs signal processing, such as down-conversion, on a radio-frequency received signal which is received via components on a receive path of the radio-frequency circuit 1 and outputs the resulting received signal to the BBIC 4. The RFIC 3 also performs signal processing, such as up-conversion, on a sending signal provided from the BBIC 4 and outputs the resulting radio-frequency sending signal to a sending path of the radio-frequency circuit 1. The RFIC 3 includes a controller that controls components, such as switches and amplifiers, of the radio-frequency circuit 1. All or some of the functions of the RFIC 3 as the controller may be installed in a source outside the RFIC 3, such as in the BBIC 4 or the radio-frequency circuit 1.

The BBIC 4 is a baseband signal processing circuit that performs signal processing by using an intermediate-frequency band, which is lower than a radio-frequency signal transmitted by the radio-frequency circuit 1. Examples of signals to be processed by the BBIC 4 are image signals for displaying images and/or audio signals for performing communication via a speaker.

The antenna 2 and the BBIC 4 are optional, but not essential, components for the communication apparatus 5 of the first embodiment.

[1.1.2 Circuit Configuration of Radio-Frequency Circuit 1]

The circuit configuration of the radio-frequency circuit 1 will now be discussed below. As illustrated in FIG. 1, the radio-frequency circuit 1 includes a power amplifier 11, a low-noise amplifier 21, switches 51 and 52, filters 61, 62, and 63, an antenna connecting terminal 100, a radio-frequency input terminal 111, and a radio-frequency output terminal 121.

The antenna connecting terminal 100 connects to the antenna 2. The radio-frequency input terminal 111 is a terminal for receiving a radio-frequency sending signal from a source that is external to (outside of) the radio-frequency circuit 1. The radio-frequency output terminal 121 is a terminal for outputting a radio-frequency received signal to another device that is external to (outside of) the radio-frequency circuit 1.

The power amplifier 11, which can connect to the filters 61, 62, and 63 via the switch 52, amplifies a radio-frequency signal received by the radio-frequency input terminal 111 and supplies the amplified radio-frequency signal to the filters 61, 62, and 63. The power amplifier 11 can amplify first, second, and third sub-band sending signals received via the radio-frequency input terminal 111. As the power amplifier 11, a multistage amplifier and/or an amplifier that first converts a radio-frequency signal into a difference signal and then amplifies it may be used. However, the power amplifier 11 is not restricted to these types of amplifiers.

The low-noise amplifier 21 can connect to the filters 61, 62, and 63 via the switch 52 and amplify a radio-frequency signal received by the antenna connecting terminal 100. The low-noise amplifier 21 can amplify first, second, and third sub-band received signals received from the antenna connecting terminal 100 via the switch 51, the filters 61, 62, and 63, and the switch 52. A radio-frequency signal amplified by the low-noise amplifier 21 is output to the radio-frequency output terminal 121. As the low-noise amplifier 21, a multistage amplifier and/or an amplifier that first converts a radio-frequency signal into a difference signal and then amplifies it may be used. However, the low-noise amplifier 21 is not restricted to these types of amplifiers.

The filter 61, which is an example of a first filter, has a pass band corresponding to the first sub-band. The filter 61 can thus allow the first sub-band signals to pass therethrough and attenuate the other frequency band signals. The filter 61 has two input/output terminals. One input/output terminal is connected to the switch 51 so that the filter 61 can connect to the antenna connecting terminal 100 via the switch 51. The other input/output terminal is connected to the switch 52 so that the filter 61 can connect to the power amplifier 11 and the low-noise amplifier 21 via the switch 52.

The filter 62, which is an example of a second filter, has a pass band corresponding to the second sub-band. The filter 62 can thus allow the second sub-band signals to pass therethrough and attenuate the other frequency band signals. The filter 62 has two input/output terminals. One input/output terminal is connected to the switch 51 so that the filter 62 can connect to the antenna connecting terminal 100 via the switch 51. The other input/output terminal is connected to the switch 52 so that the filter 62 can connect to the power amplifier 11 and the low-noise amplifier 21 via the switch 52.

In the first embodiment, the filters 61 and 62 form one multiplexer 60. That is, the filters 61 and 62 are integrated into one filter, which is connected to one terminal of the switch 51.

The filter 63, which is an example of a third filter, has a pass band corresponding to the third sub-band. The filter 63 can thus allow the third sub-band signals to pass therethrough and attenuate the other frequency band signals. The filter 63 has two input/output terminals. One input/output terminal is connected to the switch 51 so that the filter 63 can connect to the antenna connecting terminal 100 via the switch 51. The other input/output terminal is connected to the switch 52 so that the filter 63 can connect to the power amplifier 11 and the low-noise amplifier 21 via the switch 52.

Each of the filters 61, 62, and 63 may be any one of a surface acoustic wave filter, a bulk acoustic wave (BAW) filter, an LC resonance filter, and a dielectric filter. For example, using acoustic wave filters as the filters 61 and 62 can improve isolation between the filters 61 and 62 whose pass bands have a relatively narrow gap. Using an LC resonance filter as the filter 63 can implement a filter having a relatively wide pass band with a small loss.

The relationships among the first sub-band, second sub-band, and third sub-band will be explained later with reference to FIG. 2.

The pass band corresponding to a frequency band means a pass band suitable for transmitting signals of this frequency band. Accordingly, a filter having a pass band corresponding to a certain frequency band allows signals of this frequency band to pass therethrough and attenuates signals of the other frequency bands which do not overlap the frequency band corresponding to the pass band.

The switch 51 is an example of a first switch. The switch 51 is connected between the antenna connecting terminal 100 and the filters 61, 62, and 63. The specific configuration of the switch 51 is as follows. The switch 51 has terminals 511, 512, and 513. The terminal 511 is connected to the antenna connecting terminal 100. The terminal 512 is connected to the multiplexer 60, that is, the filters 61 and 62. The terminal 513 is connected to the filter 63.

With this connection configuration, the switch 51 can connect the terminal 511 to one of the terminals 512 and 513 in response to a control signal from the RFIC 3, for example. That is, the switch 51 can selectively connect the antenna 2 to the multiplexer 60 or to the filter 63. The switch 51 is constituted by a single pole double throw (SPDT) switch circuit, for example, which is also known as an antenna switch.

The switch 52 is an example of a second switch. The switch 52 is connected between the filters 61, 62, and 63 and each of the power amplifier 11 and the low-noise amplifier 21. The specific configuration of the switch 52 is as follows. The switch 52 has terminals 521 through 525. The terminals 521, 522, and 523 are respectively connected to the filters 61, 62, and 63. The terminals 524 and 525 are respectively connected to the power amplifier 11 and the low-noise amplifier 21.

With this connection configuration, the switch 52 can connect each of the terminals 521, 522, and 523 to one of the terminals 524 and 525 in response to a control signal from the RFIC 3, for example. That is, the switch 52 can selectively connect the filter 61 to the power amplifier 11 or to the low-noise amplifier 21. The switch 52 can also selectively connect the filter 62 to the power amplifier 11 or to the low-noise amplifier 21. The switch 52 can also selectively connect the filter 63 to the power amplifier 11 or to the low-noise amplifier 21. The switch 52 can connect both of the terminals 521 and 522 to one of the terminals 524 and 525 at the same time. That is, the switch 52 can connect both of the filters 61 and 62 to the power amplifier 11 or to the low-noise amplifier 21 at the same time. The switch 52 is constituted by a multiple-connection switch circuit, for example.

The provision (inclusion) of some of the circuit elements shown in FIG. 1 in the radio-frequency circuit 1 may be omitted. For example, it is sufficient that the radio-frequency circuit 1 includes at least the switch 51 and the filters 61, 62, and 63.

[1.2 Relationships Among Sub-Bands]

Prior to an explanation of the relationships among the first sub-band, second sub-band, and third sub-band, the terms concerning frequency bands in the disclosure will be defined.

A "communication band" refers to a frequency band defined by a standards organization (such as 3rd Generation Partnership Project (3GPP) and Institute of Electrical and Electronics Engineers (IEEE)) for a communication system to be constructed using a radio access technology (RAT). In the first embodiment, as the communication system, a 5GNR system, long term evolution (LTE) system, and a wireless local area network (WLAN) system, for example, may be used. However, the communication system is not limited to these types of systems. In the present disclosure, the communication band may also simply be called a band.

A time division duplex (TDD) communication band refers to a communication band in which TDD is used as a duplex mode of communication and is synonymous with a communication band used for TDD communication. The duplex mode used in a communication band is defined by a standards organization in advance.

Based on the definitions of the above-described terms concerning frequency bands, the relationships among the first sub-band, second sub-band, and third sub-band will be explained below with reference to FIG. 2. FIG. 2 is a diagram for explaining the relationships among multiple sub-bands used in the first embodiment.

Figure 2:
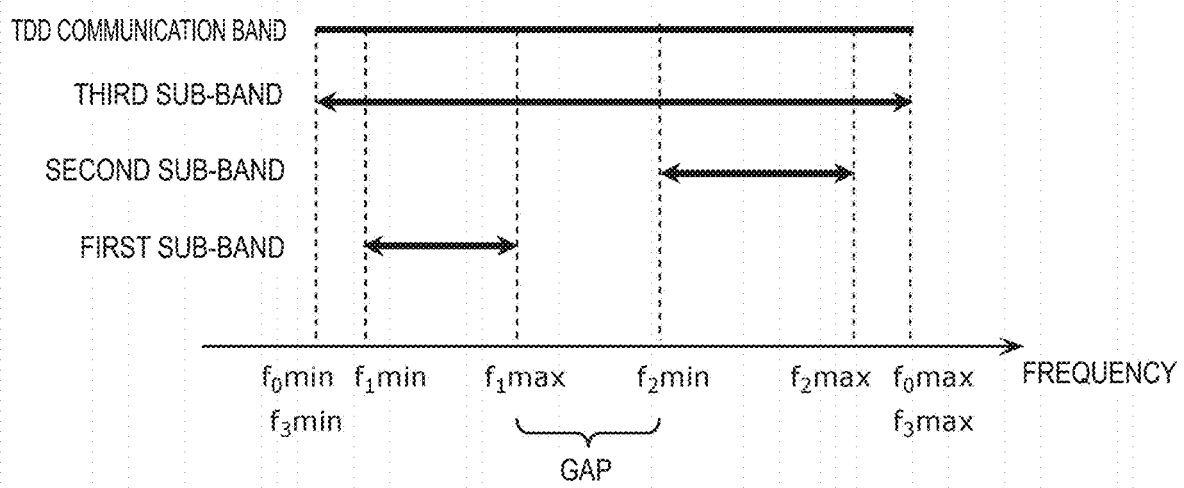
FIG. 2 is a diagram for explaining the relationships among multiple sub-bands used in the first embodiment.

As illustrated in FIG. 2, the third sub-band ($f_3$ min-$f_3$max) is included in one TDD communication band ($f_0$min-$f_0$max), which is a continuous, relatively wide band. In the example in FIG. 2, the third sub-band coincides with the TDD communication band. The TDD communication band corresponds to a first band.

The first sub-band ($f_1$min-$f_1$max) and the second sub-band ($f_2$ min-$f_2$max) are both included in the TDD communication band and are also included in the third sub-band. The lower limit frequency $f_1$min of the first sub-band and the lower limit frequency $f_2$min of the second sub-band are higher than or equal to the lower limit frequency $f_0$min of the TDD communication band and the lower limit frequency $f_3$min of the third sub-band. The upper limit frequency $f_1$max of the first sub-band and the upper limit frequency of $f_2$max of the second sub-band are lower than or equal to the upper limit frequency $f_0$max of the TDD communication band and the upper limit frequency $f_3$max of the third sub-band.

The second sub-band is located on the higher frequency side than the first sub-band and has a wider bandwidth than the first sub-band. There is a gap between the first sub-band and the second sub-band. That is, the first sub-band and the second sub-band are separated from each other and neither do they overlap nor are they adjacent to each other. More specifically, the lower limit frequency $f_2$min of the second sub-band is higher than the upper limit frequency $f_1$max of the first sub-band.

The first and second sub-bands may be allocated to a first mobile network operator (MNO) in a first region (such as Japan, USA, Europe, or China). At least part of the gap between the first sub-band and the second sub-band may be allocated to a second MNO, which is a different MNO from the first MNO, in the first region. That is, in the first region, the TDD communication band may be divided into multiple sub-bands, and among the multiple sub-bands, two sub-bands separated from each other (first sub-band and second sub-band) may be allocated to the first MNO, while one or more sub-bands included in the gap between these two sub-bands may be allocated to the second MNO.

In a second region, which is different from the first region, it is possible that the TDD communication band be not divided into multiple sub-bands and be allocated entirely to one MNO (third MNO, for example). Alternatively, the TDD communication band may be divided into multiple sub-bands whose frequency bands are different from those in the first region and be allocated to multiple MNOs.

Although the second sub-band is located on the higher frequency side than the first sub-band in FIG. 2, it may be located on the lower frequency side than the first sub-band. The bandwidth of the second sub-band is wider than that of the first sub-band. However, this is only an example. The bandwidth of the second sub-band may be narrower than or equal to that of the first sub-band. The third sub-band coincides with the TDD communication band in FIG. 2, but it may be wider than the TDD communication band. The first sub-band or the second sub-band may include a TDD communication band (second communication band), which is different from the above-described TDD communication band (first communication band).

[1.3 Advantages and Others]

As described above, a radio-frequency circuit 1 according to the first embodiment includes a switch 51 and filters 61, 62, and 63. The switch 51 is connected to an antenna connecting terminal 100. The filter 61 has a pass band corresponding to a first sub-band which is included in a first band used for TDD communication, and can connect to the antenna connecting terminal 100 via the switch 51. The filter 62 has a pass band corresponding to a second sub-band included in the first band and can connect to the antenna connecting terminal 100 via the switch 51. There is a gap between the first sub-band and the second sub-band. The filter 63 has a pass band corresponding to a third sub-band and can connect to the antenna connecting terminal 100 via the switch 51. The third sub-band includes the first sub-band, the second sub-band, and the gap.

With the above-described configuration, the radio-frequency circuit 1 includes the filter 61 having a pass band corresponding to the first sub-band and the filter 62 having a pass band corresponding to the second sub-band. Even when multiple sub-bands obtained by dividing the first band, which is a relatively wide band for TDD communication, are used, the radio-frequency circuit 1 can reduce interference between signals of the first and second sub-bands obtained by dividing the first band and those of the other sub-bands, thereby improving the quality of communication in the first and second sub-bands. In particular, the radio-frequency circuit 1 can make it less likely to cause the degradation of the receive sensitivity of signals of the first sub-band and/or the second sub-band, which would be caused by sub-band signals in the gap between the first sub-band and the second sub-band. As a result, the radio-frequency circuit 1 can implement simultaneous communication by using the non-contiguous first and second sub-bands within the first band (intra-band non-contiguous carrier aggregation). The radio-frequency circuit 1 also includes the filter 63 having a pass band corresponding to the third sub-band which includes the first sub-band, the second sub-band, and the gap therebetween. This enables the radio-frequency circuit 1 to transmit a signal of the third sub-band when the first band is not divided into multiple sub-bands, such as the first and second sub-bands. With the above-described configuration, even if the first band is divided into different sub-bands according to the countries or the regions, the radio-frequency circuit 1 is still applicable in such countries or regions. The radio-frequency circuit 1 can support communication in each of the first sub-band, the second sub-band, and the third sub-band including the gap between the first and second sub-bands and also improve the quality of communication in the first and second sub-bands. Hence, the radio-frequency circuit 1 is able to efficiently use a wide communication band.

The radio-frequency circuit 1 according to the first embodiment may further include a switch 52, a power amplifier 11, and a low-noise amplifier 21. The switch 52 is connected to the filters 61, 62, and 63. The power amplifier 11 can connect to the filters 61, 62, and 63 via the switch 52. The low-noise amplifier 21 can connect to the filters 61, 62, and 63 via the switch 52.

With this configuration, the radio-frequency circuit 1 can use the same power amplifier 11 and the same low-noise amplifier 21 for multiple sub-bands, thereby reducing the number of power amplifiers and the number of low-noise amplifiers.

In the radio-frequency circuit 1 according to the first embodiment, the filters 61 and 62 may form a multiplexer 60. The switch 51 may include a terminal 511 connected to the antenna connecting terminal 100, a terminal 512 connected to the multiplexer 60, and a terminal 513 connected to the filter 63. In the radio-frequency circuit 1 according to the first embodiment, the switch 51 may switch between a first connection state in which the terminals 511 and 512 are connected to each other and a second connection state in which the terminals 511 and 513 are connected to each other.

The two filters 61 and 62 are formed as the multiplexer 60 and can thus connect to the switch 51 only via one terminal. The radio-frequency circuit 1 thus requires only a minimal number of terminals of the switch 51, thereby improving transmission characteristics of the switch 51.

In the radio-frequency circuit 1 according to the first embodiment, the first sub-band or the second sub-band may include a second band used for TDD communication. The second band is a band different from the first band.

With this configuration, the radio-frequency circuit 1 does not require an additional circuit element to support communication using the second band. For example, if a communication band for LTE is used as the second band, the radio-frequency circuit 1 can support simultaneous communication using 5GNR and LTE (E-UTRAN New Radio-Dual Connectivity (EN-DC)). The modulation system for a 5GNR signal and that for an LTE signal are different. The radio-frequency circuit 1 may thus switch a dual signal of the power amplifier 11 between when a 5 GNR signal is amplified and when an LTE signal is amplified. In this case, the filter 63 may be omitted.

In the radio-frequency circuit 1 according to the first embodiment, the first sub-band and the second sub-band may be allocated to a first mobile network operator in a first region. At least part of the gap between the first sub-band and the second sub-band may be allocated to a second mobile network operator, which is different from the first mobile network operator, in the first region.

With this configuration, during the use of a communication service of the first mobile network operator in the first region, a radio-frequency signal of a sub-band allocated to the second mobile network operator is less likely to interfere with radio-frequency signals of the first and second sub-bands allocated to the first mobile network operator. The radio-frequency circuit 1 can thus improve the quality of the communication service of the first mobile network operator.

In the radio-frequency circuit 1 according to the first embodiment, the third sub-band may be allocated to a third mobile network operator in a second region, which is different from the first region.

With this configuration, when a communication service of the third mobile network operator is used in the second region, the radio-frequency circuit 1 can support communication using the third sub-band allocated to the third mobile network operator. The radio-frequency circuit 1 can thus support both of communication in the first region and that in the second region.

A communication apparatus 5 according to the first embodiment includes an RFIC 3 and the radio-frequency circuit 1. The RFIC 3 processes a radio-frequency signal. The radio-frequency circuit 1 transmits the radio-frequency signal between the RFIC 3 and the antenna 2.

The communication apparatus 5 can achieve advantages similar to those obtained by the radio-frequency circuit 1.

First Modified Example

A first modified example of the first embodiment will now be described below. The first modified example is different from the first embodiment principally in that the first and second filters (filters 61 and 62) do not form a multiplexer and are individually connected to the antenna switch. The first modified example will be described below with reference to FIG. 3 mainly by referring to the points different from the first embodiment.

[2.1 Circuit Configurations of Radio-Frequency Circuit 1A and Communication Apparatus 5A]

Figure 3:
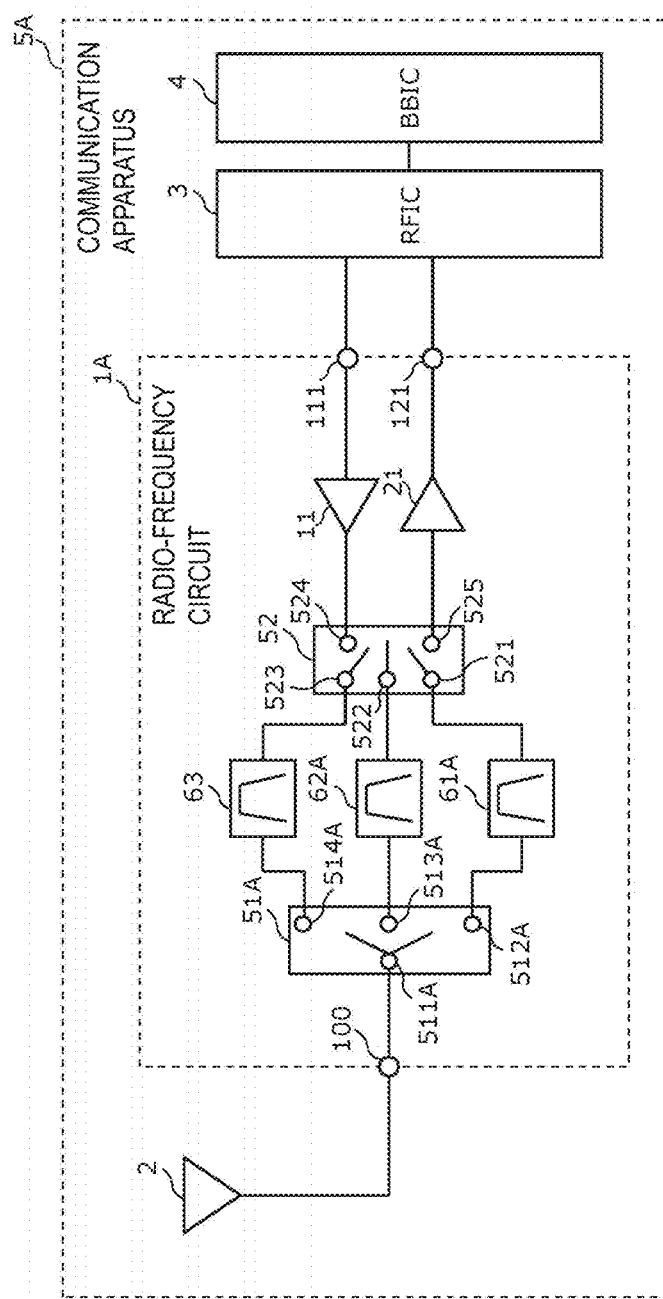
FIG. 3 is a circuit diagram of a radio-frequency circuit and a communication apparatus according to a first modified example.

The circuit configurations of a radio-frequency circuit 1A and a communication apparatus 5A according to the first modified example will be discussed below with reference to FIG. 3. FIG. 3 is a circuit diagram of the radio-frequency circuit 1A and the communication apparatus 5A according to the first modified example. The communication apparatus 5A according to the first modified example includes the radio-frequency circuit 1A, an antenna 2, an RFIC 3, and a BBIC 4. The circuit configuration of the communication apparatus 5A is similar to that of the communication apparatus 5 of the first embodiment and a detailed explanation thereof will be omitted.

[2.1.1. Circuit Configuration of Radio-Frequency Circuit 1A]

As illustrated in FIG. 3, the radio-frequency circuit 1A includes a power amplifier 11, a low-noise amplifier 21, switches 51A and 52, filters 61A, 62A, and 63, an antenna connecting terminal 100, a radio-frequency input terminal 111, and a radio-frequency output terminal 121.

The filter 61A, which is an example of the first filter, has a pass band corresponding to the first sub-band. The filter 61A can thus allow radio-frequency signals of the first sub-band to pass therethrough and attenuate radio-frequency signals of the other frequency bands. The filter 61A has two input/output terminals. One input/output terminal is connected to the switch 51A so that the filter 61A can connect to the antenna connecting terminal 100 via the switch 51A. The other input/output terminal is connected to the switch 52 so that the filter 61A can connect to the power amplifier 11 and the low-noise amplifier 21 via the switch 52.

The filter 62A, which is an example of the second filter, has a pass band corresponding to the second sub-band. The filter 62A can thus allow radio-frequency signals of the second sub-band to pass therethrough and attenuate radio-frequency signals of the other frequency bands. The filter 62A has two input/output terminals. One input/output terminal is connected to the switch 51A so that the filter 62A can connect to the antenna connecting terminal 100 via the switch 51A. The other input/output terminal is connected to the switch 52 so that the filter 62A can connect to the power amplifier 11 and the low-noise amplifier 21 via the switch 52.

The filters 61A and 62A do not form a multiplexer. That is, the filters 61A and 62A are connected to different terminals of the switch 51A.

The switch 51A is an example of the first switch. The switch 51A is connected between the antenna connecting terminal 100 and the filters 61A, 62A, and 63. The specific configuration of the switch 51A is as follows. The switch 51A has terminals 511A through 514A. The terminal 511A is connected to the antenna connecting terminal 100. The terminals 512A, 513A, and 514A are respectively connected to the filters 61A, 62A, and 63.

With this connection configuration, the switch 51A can connect the terminal 511A to at least one of the terminals 512A through 514A in response to a control signal from the RFIC 3, for example. That is, the switch 51A can switch between the connection state of the antenna 2 to each of the filters 61A, 62A, and 63 and the disconnection state of the antenna 2 from each of the filters 61A, 62A, and 63. The switch 51A can connect the terminal 511A to both of the terminals 512A and 513A at the same time. The switch 51A is constituted by a multiple-connection switch circuit, for example, which is also known as an antenna switch.

[2.2 Advantages and Others]

As described above, in the radio-frequency circuit 1A according to the first modified example, the switch 51A may include a terminal 511A connected to the antenna connecting terminal 100, a terminal 512A connected to the filter 61A, a terminal 513A connected to the filter 62A, and a terminal 514A connected to the filter 63. In the radio-frequency circuit 1A according to the first modified example, the switch 51A may switch between a first connection state in which the terminal 511A is connected to each of the terminals 512A and 513A and a second connection state in which the terminal 511A is connected to the terminal 514A.

With this configuration, the radio-frequency circuit 1A can individually connect the filters 61A and 62A to the switch 51A, thereby enhancing the isolation characteristics between the filters 61A and 62A.

Second Modified Example

A second modified example of the first embodiment will now be described below. The second modified example is different from the first embodiment principally in that a radio-frequency circuit includes a power amplifier and a low-noise amplifier for the first sub-band and those for the second and third sub-bands. The second modified example will be described below with reference to FIG. 4 mainly by referring to the points different from the first embodiment.

[3.1 Circuit Configurations of Radio-Frequency Circuit 1B and Communication Apparatus 5B]

Figure 4:
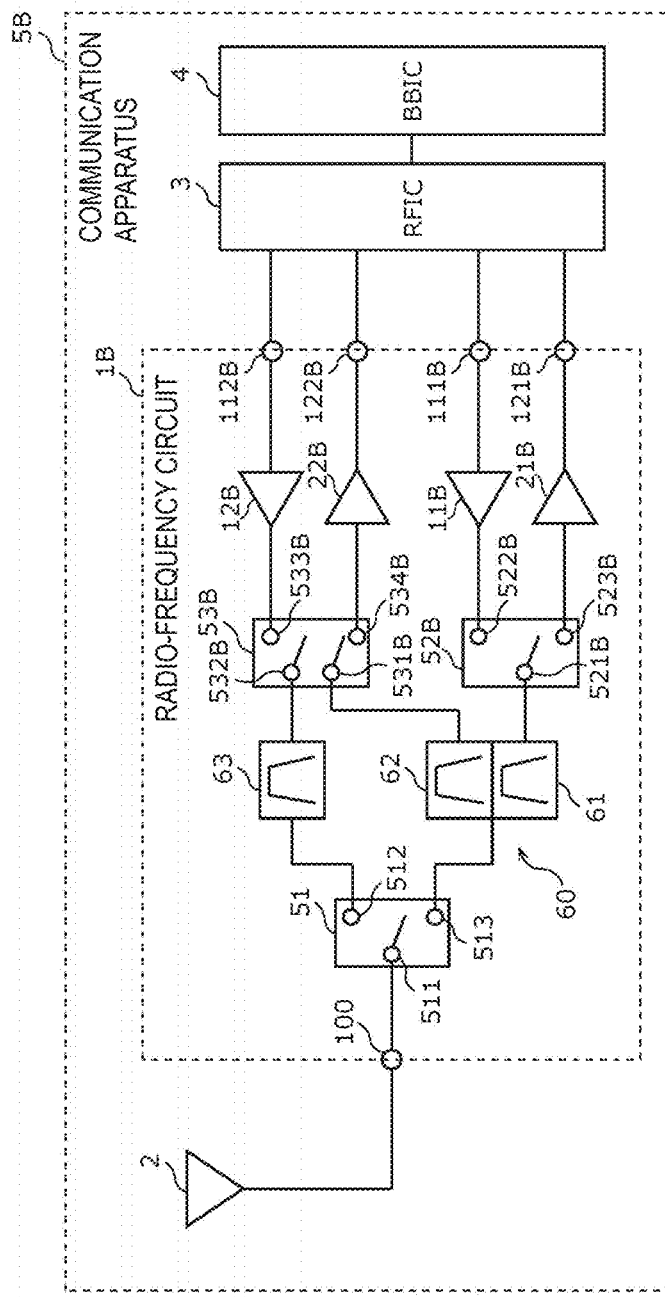
FIG. 4 is a circuit diagram of a radio-frequency circuit and a communication apparatus according to a second modified example.

The circuit configurations of a radio-frequency circuit 1B and a communication apparatus 5B according to the second modified example will be discussed below with reference to FIG. 4. FIG. 4 is a circuit diagram of the radio-frequency circuit 1B and the communication apparatus 5B according to the second modified example. The communication apparatus 5B according to the second modified example includes the radio-frequency circuit 1B, an antenna 2, an RFIC 3, and a BBIC 4. The circuit configuration of the communication apparatus 5B is similar to that of the communication apparatus 5 of the first embodiment and a detailed explanation thereof will be omitted.

[3.1.1. Circuit Configuration of Radio-Frequency Circuit 1B]

As illustrated in FIG. 4, the radio-frequency circuit 1B includes power amplifiers 11B and 12B, low-noise amplifiers 21B and 22B, switches 51, 52B, and 53B, filters 61, 62, and 63, an antenna connecting terminal 100, radio-frequency input terminals 111B and 112B, and radio-frequency output terminals 121B and 122B.

The radio-frequency input terminals 111B and 112B are terminals for receiving radio-frequency sending signals from the outside of the radio-frequency circuit 1B. More specifically, a first sub-band sending signal is input into the radio-frequency input terminal 111B, while second and third sub-band sending signals are input into the radio-frequency input terminal 112B.

The radio-frequency output terminals 121B and 122B are terminals for outputting radio-frequency received signals to the outside of the radio-frequency circuit 1B. More specifically, a first sub-band received signal is output from the radio-frequency output terminal 121B, while second and third sub-band received signals are output from the radio-frequency output terminal 122B.

The power amplifier 11B is an example of a first power amplifier. The power amplifier 11B can connect to the filter 61 via the switch 52B and amplify a radio-frequency signal received by the radio-frequency input terminal 111B and transmit the amplified radio-frequency signal to the filter 61. The power amplifier 11B can amplify a first sub-band sending signal received via the radio-frequency input terminal 111B.

The power amplifier 12B is an example of a second power amplifier. The power amplifier 12B can connect to the filters 62 and 63 via the switch 53B and amplify a radio-frequency signal received by the radio-frequency input terminal 112B and transmit the amplified radio-frequency signal to the filters 62 and 63. The power amplifier 12B can amplify second and third sub-band sending signals received via the radio-frequency input terminal 112B.

The low-noise amplifier 21B is an example of a first low-noise amplifier. The low-noise amplifier 21B can connect to the filter 61 via the switch 52B and amplify a radio-frequency signal received by the antenna connecting terminal 100. The low-noise amplifier 21B can amplify a first sub-band received signal received from the antenna connecting terminal 100 via the switch 51, the filter 61, and the switch 52B. A radio-frequency signal amplified by the low-noise amplifier 21B is output to the radio-frequency output terminal 121B.

The low-noise amplifier 22B is an example of a second low-noise amplifier. The low-noise amplifier 22B can connect to the filters 62 and 63 via the switch 53B and amplify a radio-frequency signal received by the antenna connecting terminal 100. The low-noise amplifier 22B can amplify a second sub-band received signal received from the antenna connecting terminal 100 via the switch 51, the filter 62, and the switch 53B and can also amplify a third sub-band received signal received from the antenna connecting terminal 100 via the switch 51, the filter 63, and the switch 53B. A radio-frequency signal amplified by the low-noise amplifier 22B is output to the radio-frequency output terminal 122B.

The switch 52B is an example of the second switch and is connected between the filter 61 and each of the power amplifier 11B and the low-noise amplifier 21B. More specifically, the switch 52B has terminals 521B, 522B, and 523B. The terminal 521B is connected to the filter 61. The terminals 522B and 523B are respectively connected to the power amplifier 11B and the low-noise amplifier 21B.

With this connection configuration, the switch 52B can connect the terminal 521B to one of the terminals 522B and 523B in response to a control signal from the RFIC 3, for example. That is, the switch 52B can selectively connect the filter 61 to the power amplifier 11B or to the low-noise amplifier 21B. The switch 52B is constituted by an SPDT switch circuit, for example.

The switch 53B is an example of a third switch and is connected between the filters 62 and 63 and each of the power amplifier 12B and the low-noise amplifier 22B. More specifically, the switch 53B has terminals 531B through 534B. The terminals 531B and 532B are respectively connected to the filters 62 and 63. The terminals 533B and 534B are respectively connected to the power amplifier 12B and the low-noise amplifier 22B.

With this connection configuration, the switch 53B can connect each of the terminals 531B and 532B to one of the terminals 533B and 534B in response to a control signal from the RFIC 3, for example. That is, the switch 53B can selectively connect the filter 62 to the power amplifier 12B or to the low-noise amplifier 22B. The switch 53B can also selectively connect the filter 63 to the power amplifier 12B or to the low-noise amplifier 22B. The switch 53B is constituted by two SPDT switch circuits, for example.

[3.2 Advantages and Others]

As described above, the radio-frequency circuit 1B according to the second modified example includes switches 52B and 53B, power amplifiers 11B and 12B, and low-noise amplifiers 21B and 22B. The switch 52B is connected to the filter 61. The power amplifier 11B can connect to the filter 61 via the switch 52B. The low-noise amplifier 21B can connect to the filter 61 via the switch 52B. The switch 53B is connected to the filters 62 and 63. The power amplifier 12B can connect to the filters 62 and 63 via the switch 53B. The low-noise amplifier 22B can connect to the filters 62 and 63 via the switch 53B.

With this configuration, the radio-frequency circuit 1B uses the same power amplifier 12B and the same low-noise amplifier 22B for amplifying the second and third sub-band signals, thereby reducing the number of power amplifiers and the number of low-noise amplifiers. The radio-frequency circuit 1B uses different power amplifiers and different low-noise amplifiers for the first sub-band signals and the second sub-band signals. Hence, the performance required for a power amplifier and a low-noise amplifier to implement simultaneous communication of the first and second sub-bands becomes less demanding when different power amplifiers and different low-noise amplifiers are used than when the same power amplifier and the same low-noise amplifier are used. The radio-frequency circuit 1B can also improve the quality of simultaneous communication using the first and second sub-bands.

In the radio-frequency circuit 1B according to the second modified example, the bandwidth of the second sub-band may be wider than that of the first sub-band.

With this configuration, the same amplifier can be used for the second sub-band having a wider bandwidth than the first sub-band and for the third sub-band. The amplification characteristics in the second sub-band when the same amplifier is used for the second sub-band having a wider bandwidth and for the third sub-band are less likely to deteriorate than those in the first sub-band when the same amplifier is used for the first sub-band having a narrower bandwidth and for the third sub-band. It is thus possible to suppress the degradation of the amplification characteristics (such as a decline in the peak gain) caused by the use of the same amplifier for multiple sub-bands, as well as to reduce the number of amplifiers.

Third Modified Example

A third modified example of the first embodiment will now be described below. In the first embodiment and the first and second modified examples thereof, the third sub-band includes two sub-bands and a gap therebetween. However, the third sub-band may include three or more sub-bands and gaps therebetween. In the third modified example, the third sub-band also include a fourth sub-band. The third modified example will be described below with reference to FIG. 5 mainly by referring to the points different from the first embodiment.

[4.1 Circuit Configurations of Radio-Frequency Circuit 1C and Communication Apparatus 5C]

Figure 5:
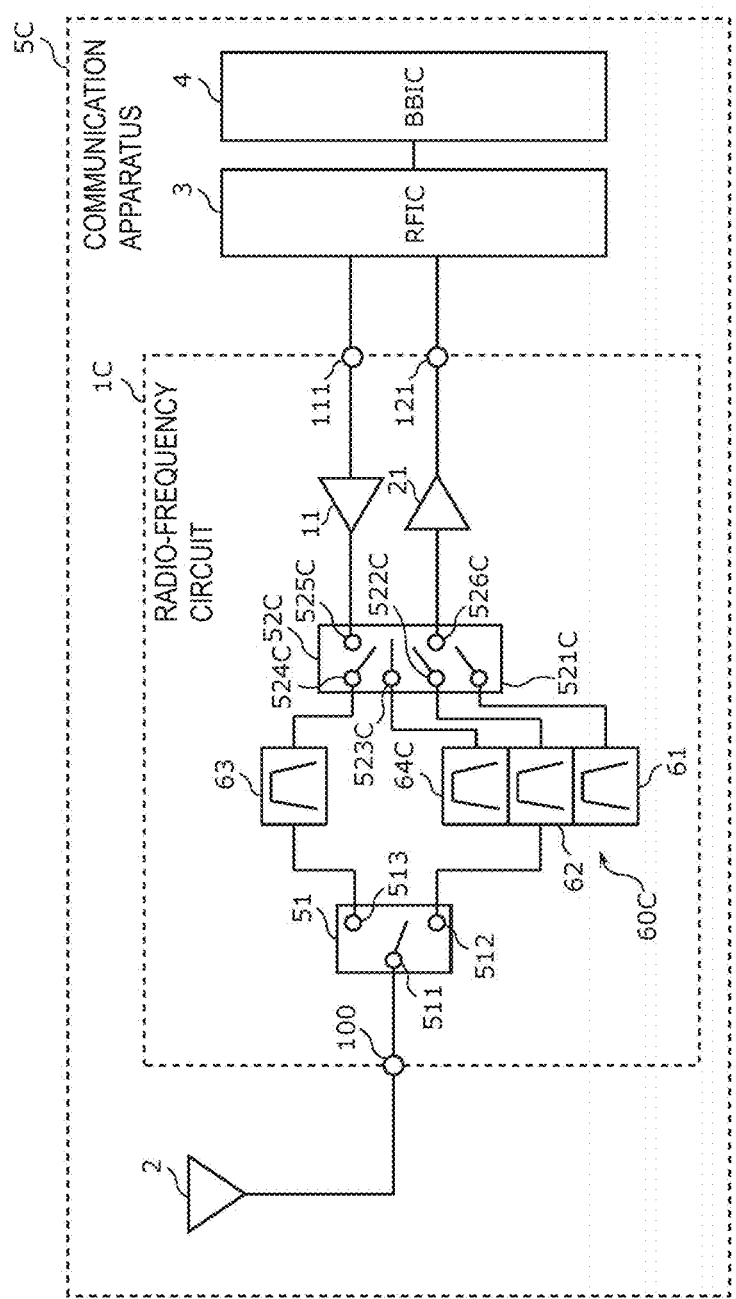
FIG. 5 is a circuit diagram of a radio-frequency circuit and a communication apparatus according to a third modified example.

The circuit configurations of a radio-frequency circuit 1C and a communication apparatus 5C according to the third modified example will be discussed below with reference to FIG. 5. FIG. 5 is a circuit diagram of the radio-frequency circuit 1C and the communication apparatus 5C according to the third modified example. The communication apparatus 5C according to the third modified example includes the radio-frequency circuit 1C, an antenna 2, an RFIC 3, and a BBIC 4. The circuit configuration of the communication apparatus 5C is similar to that of the communication apparatus 5 of the first embodiment and a detailed explanation thereof will be omitted.

[4.1.1. Circuit Configuration of Radio-Frequency Circuit 1C]

As illustrated in FIG. 5, the radio-frequency circuit 1C includes a power amplifier 11, a low-noise amplifier 21, switches 51 and 52C, filters 61, 62, 63, and 64C, an antenna connecting terminal 100, a radio-frequency input terminal 111, and a radio-frequency output terminal 121.

The filter 64C, which is an example of a fourth filter, has a pass band corresponding to the fourth sub-band. The filter 64C can thus allow radio-frequency signals of the fourth sub-band to pass therethrough and attenuate radio-frequency signals of the other frequency bands. The filter 64C has two input/output terminals. One input/output terminal is connected to the switch 51 so that the filter 64C can connect to the antenna connecting terminal 100 via the switch 51. The other input/output terminal is connected to the switch 52C so that the filter 64C can connect to the power amplifier 11 and the low-noise amplifier 21 via the switch 52C.

In the third modified example, the filters 61, 62, and 64C form one multiplexer 60C. That is, the filters 61, 62, and 64C are integrated into one filter, which is connected to one terminal of the switch 51.

As in the first and second sub-bands, the fourth sub-band is included in the third sub-band. There is a gap between the fourth sub-band and the first sub-band. There is also a gap between the fourth sub-band and the second sub-band.

The switch 52C is an example of the second switch. The switch 52C is connected between the filters 61, 62, 63, and 64C and each of the power amplifier 11 and the low-noise amplifier 21. The specific configuration of the switch 52C is as follows. The switch 52C has terminals 521C through 526C. The terminals 521C, 522C, 523C, and 524C are respectively connected to the filters 61, 62, 64C, and 63. The terminals 525C and 526C are respectively connected to the power amplifier 11 and the low-noise amplifier 21.

With this connection configuration, the switch 52C can connect each of the terminals 521C through 524C to one of the terminals 525C and 526C in response to a control signal from the RFIC 3, for example. That is, the switch 52C can selectively connect the filter 61 to the power amplifier 11 or to the low-noise amplifier 21. The switch 52C can also selectively connect the filter 62 to the power amplifier 11 or to the low-noise amplifier 21. The switch 52C can also selectively connect the filter 63 to the power amplifier 11 or to the low-noise amplifier 21. The switch 52C can also selectively connect the filter 64C to the power amplifier 11 or to the low-noise amplifier 21. The switch 52C can connect at least two of the terminals 521C through 523C to one of the terminals 525C and 526C at the same time. That is, the switch 52C can connect at least two of the filters 61, 62, and 64C to the power amplifier 11 or to the low-noise amplifier 21 at the same time. The switch 52C is constituted by a multiple-connection switch circuit, for example.

[4.2 Advantages and Others]

As described above, the radio-frequency circuit 1C according to the third modified example may further include a filter 64C. The filter 64C has a pass band corresponding to a fourth sub-band included in the first band and can connect to the antenna connecting terminal 100 via the switch 51. There is a gap between the fourth sub-band and each of the first sub-band and the second sub-band. The third sub-band may also include the fourth sub-band.

The radio-frequency circuit 1C includes the filter 64C having a pass band corresponding to the fourth sub-band. The radio-frequency circuit 1C can thus support communication in each of the first sub-band, the second sub-band, the fourth sub-band, and the third sub-band including gaps therebetween and also improve the quality of communication in the first, second, and fourth sub-bands.

The third sub-band may include one or more sub-bands in addition to the first, second, and fourth sub-bands. In this case, the radio-frequency circuit 1C may include one or more filters whose pass bands individually correspond to the additional sub-bands.

EXAMPLES

Examples of the individual sub-bands used in the above-described first embodiment and modified examples thereof will be explained below with reference to FIG. 6. FIG. 6 is a table illustrating some specific examples of the sub-bands. The sub-bands illustrated in FIG. 6 are only examples and do not limit sub-bands to which the above-described first embodiment and modified examples are applicable.

The table illustrated in FIG. 6 shows nine specific examples that can be identified by No. 1 through No. 9. The nine specific examples will be individually explained below in this order. Hereinafter, three different MNOs will be called MNO1, MNO2, and MNO3.

[No. 1]

As the first sub-band, a frequency band of 3.7 to 3.8 gigahertz (GHz) is used. As the second sub-band, a frequency band of 4.0 to 4.1 GHz is used. As the third sub-band, a frequency band of 3.3 to 4.2 GHz is used.

The third sub-band includes band n77 for 5GNR, which is an example of the first band. In Japan, the first sub-band and the second sub-band are both allocated to MNO1, while one or more sub-bands included in the gap between the first and second sub-bands are allocated to MNO2 and/or MNO3.

[No. 2]

As the first sub-band, a frequency band of 3.44 to 3.52 GHz is used. As the second sub-band, a frequency band of 3.6 to 3.7 GHz is used. As the third sub-band, the frequency band of 3.3 to 4.2 GHz is used.

The third sub-band includes band n77 for 5GNR, which is an example of the first band. In Japan, the first sub-band and the second sub-band are both allocated to MNO2, while the gap between the first and second sub-bands is allocated to MNO1 and/or MNO3.

[No. 3]

As the first sub-band, the frequency band of 3.44 to 3.52 GHz is used. As the second sub-band, a frequency band of 3.55 to 3.70 GHz is used. As the third sub-band, the frequency band of 3.3 to 4.2 GHz is used.

The third sub-band includes band n77 for 5GNR, which is an example of the first band. The second sub-band includes band n48 for 5GNR or Band 48 for LTE, both of which are examples of a second band. In Japan, the first sub-band and part of the second sub-band are both allocated to MNO2, while the gap between the first and second sub-bands and the remaining part of the second sub-band are allocated to MNO1 and/or MNO3.

[No. 4]

As the first sub-band, a frequency band of 3.4 to 3.6 GHz is used. As the second sub-band, a frequency band of 3.9 to 4.0 GHz is used. As the third sub-band, the frequency band of 3.3 to 4.2 GHz is used.

The third sub-band includes band n77 for 5GNR, which is an example of the first band. In Japan, the first sub-band includes two frequency bands allocated to MNO3 and also includes two frequency bands allocated to MNO1 and MNO2. In Japan, the second sub-band is allocated to MNO3, while the gap between the first and second sub-bands is allocated to MNO1 and/or MNO2.

[No. 5]

As the first sub-band, a frequency band of 3.3 to 3.8 GHz is used. As the second sub-band, a frequency band of 3.9 to 4.0 GHz is used. As the third sub-band, the frequency band of 3.3 to 4.2 GHz is used.

The third sub-band includes band n77 for 5GNR, which is an example of the first band. The first sub-band includes band n78 for 5GNR, which is an example of the second band. In Japan, the first sub-band includes two frequency bands allocated to MNO3. In Japan, the second sub-band is allocated to MNO3, while the gap between the first and second sub-bands is allocated to MNO1 and/or MNO2.

[No. 6]

As the first sub-band, a frequency band of 3.40 to 3.44 GHz is used. As the second sub-band, a frequency band of 3.56 to 3.60 GHz is used. As the third sub-band, the frequency band of 3.3 to 4.2 GHz is used. As the fourth sub-band, a frequency band of 3.9 to 4.0 GHz is used.

The third sub-band includes band n77 for 5GNR, which is an example of the first band. In Japan, the first sub-band, the second sub-band, and the fourth sub-band are all allocated to MNO3, while the gap between the first and second sub-bands and the gap between the second and fourth sub-bands are allocated to MNO2 and/or MNO3.

[No. 7]

As the first sub-band, the frequency band of 3.40 to 3.44 GHz is used. As the second sub-band, the frequency band of 3.56 to 3.60 GHz is used. As the third sub-band, a frequency band of 3.3 to 3.8 GHz is used.

The third sub-band includes band n78 for 5GNR, which is an example of the first band. In Japan, the first sub-band and the second sub-band are both allocated to MNO3, while the gap between the first and second sub-bands is allocated to MNO2 and/or MNO3.

[No. 8]

As the first sub-band, a frequency band of 5.15 to 5.35 GHz is used. As the second sub-band, a frequency band of 5.470 to 5.925 GHz is used. As the third sub-band, a frequency band of 5.150 to 5.925 GHz is used.

[No. 9]

As the first sub-band, a frequency band of 5.925 to 6.425 GHz is used. As the second sub-band, a frequency band of 6.525 to 7.125 GHz is used. As the third sub-band, a frequency band of 5.925 to 7.125 GHz is used.

Second Embodiment

A second embodiment will now be described below. The second embodiment is different from the first embodiment mainly in that frequency bands included in a frequency range (frequency range 2 (FR2)) of millimeter-wave bands are used as the first through third sub-bands. The second embodiment will be described below with reference to FIG. 7 mainly by referring to the points different from the first embodiment.

[4.1 Circuit Configurations of Radio-Frequency Circuit 1D and Communication Apparatus 5D]

Figure 7:
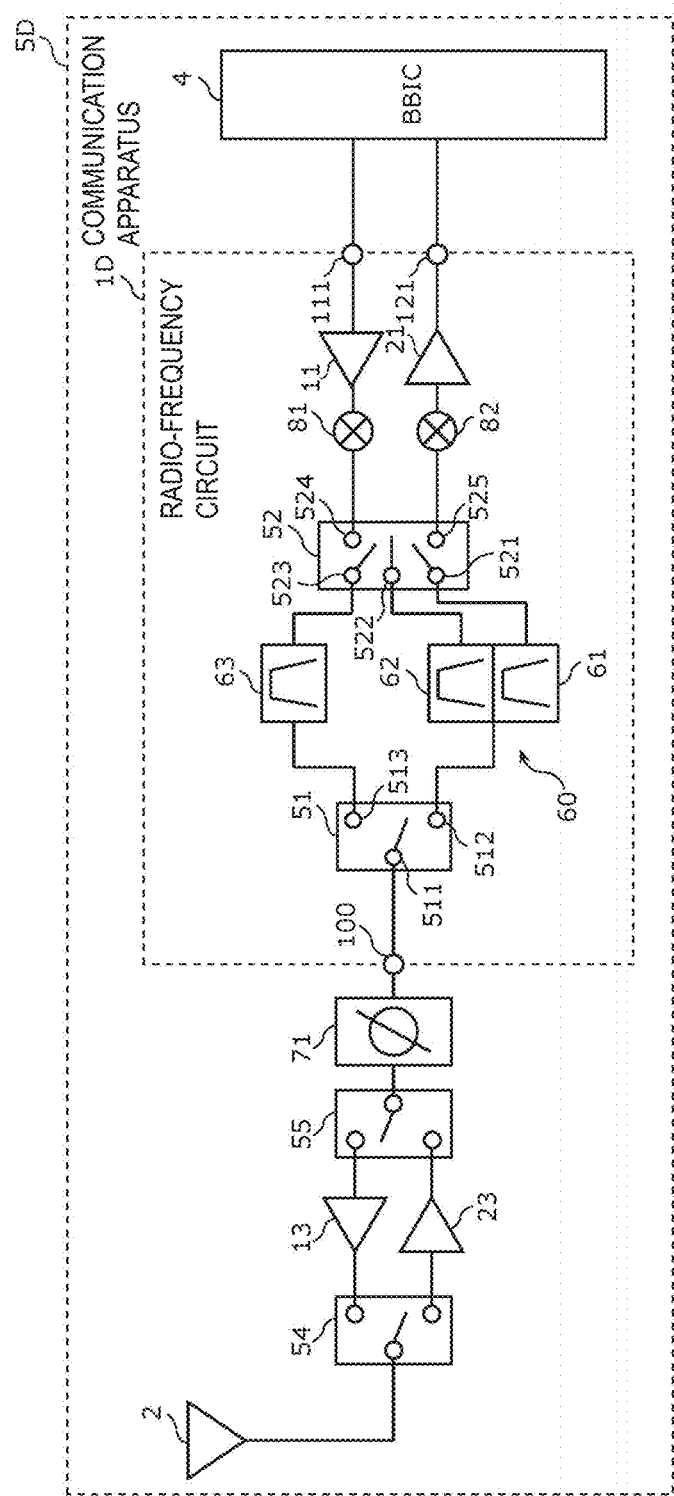
FIG. 7 is a circuit diagram of a radio-frequency circuit and a communication apparatus according to a second embodiment.

FIG. 7 is a circuit diagram of a radio-frequency circuit 1D and a communication apparatus 5D according to the second embodiment. As illustrated in FIG. 7, the communication apparatus 5D includes the radio-frequency circuit 1D, an antenna 2, a power amplifier 13, a low-noise amplifier 23, switches 54 and 55, a phase shifter 71, and a BBIC 4. The communication apparatus 5D of the second embodiment is different from the communication apparatus 5 of the first embodiment in that the switches 54 and 55, power amplifier 13, low-noise amplifier 23, and phase shifter 71 are added. The configuration of the radio-frequency circuit 1D is also different from that of the radio-frequency circuit 1.

The switch 54 is a switch circuit that selectively connects to the power amplifier 13 or to the low-noise amplifier 23. Likewise, the switch 55 is a switch circuit that selectively connects to the power amplifier 13 or to the low-noise amplifier 23. That is, the switches 54 and 55 are switch circuits that allow a sending signal to be sent from the antenna 2 or a received signal received by the antenna 2 to flow through the communication apparatus 5D.

The power amplifier 13 is connected between the switches 54 and 55 and amplifies sending signals of the first, second, and third sub-bands. The low-noise amplifier 23 is connected between the switches 54 and 55 and amplifies received signals of the first, second, and third sub-bands.

The phase shifter 71 is connected between the switch 55 and the antenna connecting terminal 100 of the radio-frequency circuit 1D and shifts the phase of sending signals of the first, second, and third sub-bands and that of received signals of the first, second, and third sub-bands.

The radio-frequency circuit 1D includes a power amplifier 11, a low-noise amplifier 21, switches 51 and 52, filters 61, 62, and 63, mixers 81 and 82, an antenna connecting terminal 100, a radio-frequency input terminal 111, and a radio-frequency output terminal 121.

The mixer 81 is connected between a terminal 524 of the switch 52 and the output terminal of the power amplifier 11 and converts an intermediate-frequency sending signal to a millimeter-wave sending signal.

The mixer 82 is connected between a terminal 525 of the switch 52 and the input terminal of the low-noise amplifier 21 and converts a millimeter-wave received signal to an intermediate-frequency received signal.

In the second embodiment, as the filters 61, 62, and 63, a distributed-element circuit or a stub may be used.

In the second embodiment, as the first band, 5GNR n257, n258, n259, n260, or n262, for example, may be used. However, the first band is not limited to these bands.

Other Modified Examples

The radio-frequency circuits and communication apparatuses have been discussed above through illustration of the embodiments and modified examples. However, the invention is not restricted to the above-described embodiments and modified examples. Other embodiments implemented by combining certain components in the above-described embodiments and modified examples, and other modified examples obtained by making various modifications to the above-described embodiments by those skilled in the art without departing from the scope and spirit of the invention are also encompassed in the invention. Various devices integrating the above-described radio-frequency circuits and communication apparatuses are also encompassed in the invention.

For example, in the circuit configurations of the radio-frequency circuits and communication apparatuses according to the embodiments and modified examples, another circuit element and another wiring may be inserted onto a path connecting circuit elements and/or a path connecting signal paths illustrated in the drawings. For example, in the above-described embodiments, a filter may be inserted between the antenna connecting terminal 100 and the switch 51. A matching circuit may be inserted between the antenna connecting terminal 100 and the filters 61, 62, and 63 and/or between the filters 61, 62, and 63 and each of the power amplifier 11 and the low-noise amplifier 21.

In the above-described embodiments and modified examples, TDD communication bands for 5GNR or LTE are used. In addition to or instead of 5GNR or LTE, a communication band for another radio access technology (RAT) may be used. For example, a communication band for a WLAN may be used as a TDD communication band. Additionally, a millimeter-wave band of 7 GHz or higher may be used as a TDD communication band. In this case, a distributed-element filter may be used as a filter.

In the above-described embodiments and modified examples, the same power amplifier and the same low-noise amplifier are used for two or three sub-bands. However, this is only an example. For instance, a power amplifier and a low-noise amplifier may be provided for each sub-band. For example, in FIG. 1, the filter 61 may connect to a first power amplifier and a first low-noise amplifier via a switch; the filter 62 may connect to a second power amplifier and a second low-noise amplifier via a switch; and the filter 63 may connect to a third power amplifier and a third low-noise amplifier via a switch.

The present invention can be widely used for a communication apparatus, such as a cellular phone, as a radio-frequency circuit provided in a front-end portion.

What is claimed is:

1. A radio-frequency circuit comprising:
    a first switch connected to an antenna connecting terminal;
    a first filter that has a pass band corresponding to a first sub-band and that is configured to be switchably connected to the antenna connecting terminal via the first switch, the first sub-band being included in a first band of a time division duplex (TDD) communication system;
    a second filter that has a pass band corresponding to a second sub-band included in the first band, the second filter configured to be switchably connected to the antenna connecting terminal via the first switch, there being a gap between the first sub-band and the second sub-band; and
    a third filter that has a pass band corresponding to a third sub-band and that is configured to be switchably connected to the antenna connecting terminal via the first switch, the third sub-band including the first sub-band, the second sub-band, and the gap.

2. The radio-frequency circuit according to claim 1, further comprising:
    a second switch connected to the first filter, the second filter, and the third filter;
    a power amplifier configured to be switchably connected to the first filter, the second filter, and the third filter via the second switch; and
    a low-noise amplifier configured to be switchably connected to the first filter, the second filter, and the third filter via the second switch.

3. The radio-frequency circuit according to claim 1, further comprising:
    a second switch connected to the first filter;
    a first power amplifier configured to be switchably connected to the first filter via the second switch;
    a first low-noise amplifier configured to be switchably connected to the first filter via the second switch;
    a third switch connected to the second and third filters;
    a second power amplifier configured to be switchably connected to the second filter and the third filter via the third switch; and
    a second low-noise amplifier configured to be switchably connected to the second filter and the third filter via the third switch.

4. The radio-frequency circuit according to claim 3, wherein a bandwidth of the second sub-band is wider than a bandwidth of the first sub-band.

5. The radio-frequency circuit according to claim 1, wherein:
    the first filter and the second filter collectively form a multiplexer; and
    the first switch includes
        a first terminal connected to the antenna connecting terminal,
        a second terminal connected to the multiplexer, and
        a third terminal connected to the third filter.

6. The radio-frequency circuit according to claim 5, wherein the first switch switches between a first connection state in which the first terminal and the second terminal are connected to each other and a second connection state in which the first terminal and the third terminal are connected to each other.

7. The radio-frequency circuit according to claim 1, wherein:
    the first switch includes
        a first terminal connected to the antenna connecting terminal,
        a second terminal connected to the first filter,
        a third terminal connected to the second filter, and
        a fourth terminal connected to the third filter.

8. The radio-frequency circuit according to claim 7, wherein the first switch switches between a first connection state in which the first terminal is connected to each of the second terminal and the third terminal, and a second connection state in which the first terminal is connected to the fourth terminal.

9. The radio-frequency circuit according to claim 1, wherein the first sub-band or the second sub-band includes a second band used for time division duplex communication, the second band being a band different from the first band.

10. The radio-frequency circuit according to claim 1, further comprising:
    a fourth filter that has a pass band corresponding to a fourth sub-band included in the first band and that is configured to be switchably connected to the antenna connecting terminal via the first switch, there being a gap between the fourth sub-band and each of the first sub-band and the second sub-band,
    wherein the third sub-band also includes the fourth sub-band.

11. The radio-frequency circuit according to claim 1, wherein:
    the first band is band n77 for 5th Generation New Radio;
    the first sub-band is in a range of 3.7 to 3.8 gigahertz;
    the second sub-band is in a range of 4.0 to 4.1 gigahertz; and
    the third sub-band is in a range of 3.3 to 4.2 gigahertz.

12. The radio-frequency circuit according to claim 1, wherein:
    the first band is band n77 for 5th Generation New Radio;
    the first sub-band is in a range of 3.44 to 3.52 gigahertz;
    the second sub-band is in a range of 3.6 to 3.7 gigahertz; and
    the third sub-band is in a range of 3.3 to 4.2 gigahertz.

13. The radio-frequency circuit according to claim 9, wherein:
the first band is band n77 for 5th Generation New Radio;
the second band is band n48 for 5th Generation New Radio or Band 48 for Long Term Evolution;
the first sub-band is in a range of 3.44 to 3.52 gigahertz;
the second sub-band is in a range of 3.55 to 3.70 gigahertz, the second sub-band including the second band; and
the third sub-band is in a range of 3.3 to 4.2 gigahertz.

14. The radio-frequency circuit according to claim 1, wherein:
the first band is band n77 for 5th Generation New Radio;
the first sub-band is in a range of 3.4 to 3.6 gigahertz;
the second sub-band is in a range of 3.9 to 4.0 gigahertz; and
the third sub-band is in a range of 3.3 to 4.2 gigahertz.

15. The radio-frequency circuit according to claim 9, wherein:
the first band is band n77 for 5th Generation New Radio;
the second band is band n78 for 5th Generation New Radio;
the first sub-band is in a range of 3.3 to 3.8 gigahertz, the first sub-band including the second band;
the second sub-band is in a range of 3.9 to 4.0 gigahertz; and
the third sub-band is in a range of 3.3 to 4.2 gigahertz.

16. The radio-frequency circuit according to claim 10, wherein:
the first band is band n77 for 5th Generation New Radio;
the first sub-band is in a range of 3.40 to 3.44 gigahertz;
the second sub-band is in a range of 3.56 to 3.60 gigahertz;
the third sub-band is in a range of 3.3 to 4.2 gigahertz; and
the fourth sub-band is in a range of 3.9 to 4.0 gigahertz.

17. The radio-frequency circuit according to claim 1, wherein:
the first band is band n78 for 5th Generation New Radio;
the first sub-band is in a range of 3.40 to 3.44 gigahertz;
the second sub-band is in a range of 3.56 to 3.60 gigahertz; and
the third sub-band is in a range of 3.3 to 3.8 gigahertz.

18. The radio-frequency circuit according to claim 1, wherein:
the first sub-band and the second sub-band are allocated to a first mobile network operator in a first region; and
at least part of the gap is allocated to a second mobile network operator in the first region, the second mobile network operator being a mobile network operator different from the first mobile network operator.

19. The radio-frequency circuit according to claim 18, wherein the third sub-band is allocated to a third mobile network operator in a second region, the second region being a region different from the first region.

20. A radio-frequency circuit comprising:
a first switch connected to an antenna connecting terminal;
a first filter that has a pass band corresponding to a first sub-band and that is configured to be switchably connected to the antenna connecting terminal via the first switch, the first sub-band being included in a first band;
a second filter that has a pass band corresponding to a second sub-band included in the first band and that is configured to be switchably connected to the antenna connecting terminal via the first switch, there being a gap between the first sub-band and the second sub-band;
a third filter that has a pass band corresponding to a third sub-band and that is configured to be switchably connected to the antenna connecting terminal via the first switch, the third sub-band including the first sub-band, the second sub-band, and the gap;
a second switch connected to the first filter;
a first power amplifier configured to be switchably connected to the first filter via the second switch;
a first low-noise amplifier configured to connect to the first filter via the second switch;
a third switch connected to the second and third filters;
a second power amplifier configured to be switchably connected to the second and third filters via the third switch; and
a second low-noise amplifier configured to be switchably connected to the second and third filters via the third switch.

* * * * *